United States Patent
Hu et al.

(10) Patent No.: US 8,787,574 B2
(45) Date of Patent: Jul. 22, 2014

(54) MULTICAST KEY NEGOTIATION METHOD SUITABLE FOR GROUP CALLING SYSTEM AND A SYSTEM THEREOF

(75) Inventors: Yanan Hu, Xi'an (CN); Jun Cao, Xi'an (CN); Manxia Tie, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

(21) Appl. No.: 13/637,375

(22) PCT Filed: May 12, 2010

(86) PCT No.: PCT/CN2010/072660
§ 371 (c)(1),
(2), (4) Date: Sep. 26, 2012

(87) PCT Pub. No.: WO2011/120249
PCT Pub. Date: Oct. 6, 2011

(65) Prior Publication Data
US 2013/0016838 A1    Jan. 17, 2013

(51) Int. Cl.
*H04K 1/00*       (2006.01)
*H04L 9/00*       (2006.01)
*H04L 9/32*       (2006.01)

(52) U.S. Cl.
USPC ............ 380/255; 713/163; 713/168; 713/189

(58) Field of Classification Search
USPC .......... 713/150, 163, 168–171, 181; 380/255, 380/270, 277, 44
See application file for complete search history.

(56) References Cited

U.S. PATENT DOCUMENTS

| | | | | |
|---|---|---|---|---|
| 6,556,835 | B1* | 4/2003 | Raivisto | 455/466 |
| 7,907,733 | B2* | 3/2011 | Cho et al. | 380/273 |
| 8,284,773 | B1* | 10/2012 | Woleben et al. | 370/390 |
| 2008/0049941 | A1 | 2/2008 | Kim et al. | |
| 2012/0159587 | A1* | 6/2012 | Ge et al. | 726/6 |

FOREIGN PATENT DOCUMENTS

| | | |
|---|---|---|
| CN | 1642073 A | 7/2005 |
| CN | 101137123 A | 3/2008 |
| CN | 101345765 A | 1/2009 |
| CN | 101635710 A | 1/2010 |

OTHER PUBLICATIONS

International Search Report (in Chinese with English translation) and Written Opinion (in Chinese) for PCT/CN2010/072660, mailed Dec. 30, 2010; ISA/CN.

* cited by examiner

*Primary Examiner* — Hosuk Song
(74) *Attorney, Agent, or Firm* — Harness, Dickey & Pierce, P.L.C.

(57) ABSTRACT

The present invention discloses a multicast key negotiation method suitable for group calling system and a system thereof. The method includes that: a user terminal (UT) negotiates about a unicast key with a base station (BS), derives an information encryption key and an integrity verifying key according to the unicast key, and registers a service group identifier that the UT belongs to at the BS; the BS notifies the UT the multicast key of the service group that the UT needs to apply, constructs a multicast key notification packet, and sends it to the UT; after receiving the multicast key notification packet sent by the BS, the UT obtains the multicast key of the service group that the UT needs to apply by decrypting a service group key application list, constructs a multicast key confirmation packet, and sends it to the BS; the BS confirms that the multicast key of the UT service group is built successfully according to the multicast key confirmation packet sent by the UT.

16 Claims, 1 Drawing Sheet

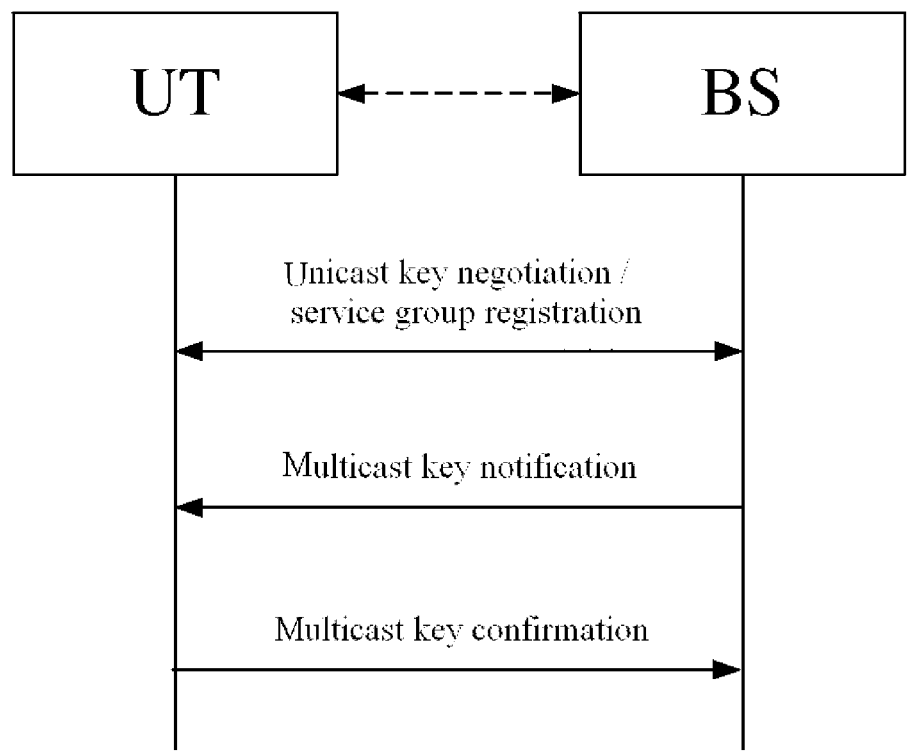

MULTICAST KEY NEGOTIATION METHOD SUITABLE FOR GROUP CALLING SYSTEM AND A SYSTEM THEREOF

CROSS-REFERENCE TO RELATED APPLICATIONS

This application is a 371 U.S. National Stage of International Application No. PCT/CN2010/072660, filed on May 12, 2010, which claims the priority to Chinese Patent Application No. 201010136883.0, entitled "Multicast Key Negotiation Method Suitable for a Group Call System and System Thereof", filed with the Chinese Patent Office on Mar. 31, 2010. The contents of the above applications are incorporated herein by reference in their entirety.

FIELD OF THE INVENTION

The present invention belongs to the field of network security and relates to a multicast key negotiation method suitable for a group call system and a system thereof. In particular, the present invention relates to a multicast key negotiation method and system suitable for a group call system with SCDMA (Synchronous Code Division Multiple Access) broadband access technology.

BACKGROUND OF THE INVENTION

The SCDMA is a broadband wireless access technology of Synchronous Code Division Multiple Access. The SCDMA employs advanced technologies such as smart antenna, software radio, SWAP (Synchronous Wireless Access Protocol) and Air Interface Protocol, and may develop services in the manner of group call. In security solution for air interface of the SCDMA technical standard, a multicast key negotiation method between a user terminal (UT) and a base station (BS) for a group call system is not described.

In consideration of characteristics of the group call system with SCDMA broadband access technology, the generation, updating of the multicast key of a service group and the use of the multicast key after switching group members shall meet the following requirements: 1) the BS does not record a message of the group to which each UT pertains; 2) the BS provides different service groups, and UTs which are served in the same service group may be distributed under different BSs; 3) it is the BS to generate the multicast key of the service group due to it shall have the ability of switching. All group call services in the SCDMA network need to be provided in the manner of multicast, and it will not be guaranteed that the group call services provided by the multicast can be performed more effectively without a secure method and system for the multicast key negotiation.

SUMMARY OF THE INVENTION

To solve the above problems described in the background art, an embodiment of the present invention provides a multicast key negotiation method suitable for a group call system and a system thereof, so as to improve the security of group call services provided by the multicast.

The embodiment of the present invention provides a multicast key negotiation method suitable for a group call system, and the method comprises:

1) negotiating a unicast key between a UT and a BS, deriving an information encryption key and an integrity check key from the unicast key, and registering by the UT to the BS identifiers of service groups to which the UT pertains;

2) notifying, by the BS, the UT of multicast keys of service groups to be applied by the UT, constructing a multicast key notification message which comprises a service group key application list and a message integrity check value, and sending the multicast key notification message to the UT, wherein the service group key application list, which is a ciphertext obtained by encryption using the information encryption key, comprises a identifiers and the related multicast keys of the service groups to be applied by the UT;

3) decrypting, by the UT, the service group key application list on receiving the multicast key notification message sent by the BS to obtain the multicast keys of the service groups to be applied by the UT, constructing a multicast key confirmation message which comprises a service group key response list and the message integrity check value, and sending the multicast key confirmation message to the BS, wherein the service group response list, which is a ciphertext obtained by encryption using the information encryption key, comprises identifiers of the service groups which have been applied; and 4) confirming, by the BS, that the multicast keys of the service groups for the UT have been established successfully upon the multicast key confirmation message sent by the UT.

The embodiment of the present invention further provides a multicast key negotiation system suitable for a group call system. The multicast key negotiation system includes a UT and a BS. The BS sends a multicast key notification message to the UT. The UT receives the multicast notification message and decrypts a service group key application list from the multicast key notification message to obtain multicast keys of the service groups, constructs a multicast key confirmation message and sends the multicast key confirmation message to the BS.

The advantages of the embodiment of the present invention are as follows.

The multicast key negotiation method and system particularly suitable for a group call system with the SCDMA broadband wireless technology are provided. In the present solutions of SCDMA, there is no description about the multicast key negotiation method for the group call system. The embodiment of the present invention provides a secure multicast key negotiation method and system, and ensures that the group call service provided by using the multicast can be performed more effectively.

BRIEF DESCRIPTION OF THE DRAWINGS

FIG. 1 is a schematic block diagram of a multicast key negotiation process suitable for a group call system according to an embodiment of the present invention.

DETAILED DESCRIPTION OF THE INVENTION

Referring to FIG. 1, an embodiment of the present invention provides a multicast key negotiation method suitable for a group call system, and the method includes the following steps.

1) A UT negotiates a unicast key TEK with a BS. Each unicast key TEK corresponds to one unicast index TEKID. An information encryption key and an integrity check key are derived by using the unicast key TEK. The UT notifies the BS of identifiers of service groups GIDs to which the UT pertains by a service registration.

2) The BS sends a multicast key notification message to the UT, wherein the BS notifies the UT of the multicast keys of the service groups to be applied by the UT, and constructs the multicast key notification message. The multicast key notification message comprises a unicast key index NONCE, a service group key application list and a message integrity check MIC value.

The unicast key index NONCE is a random number generated by the BS to guarantee the freshness of a message.

The service group key application list comprises identifiers of the service groups GIDs and multicast keys of the service groups GEKs, wherein the service groups are to be applied by the UT. If a multicast key of the service group is applied for the first time in a network, the multicast key of the service group is generated by the BS. If a multicast key of the service group has been applied in the network, the multicast key of the service group applied in a first application is forwarded by the BS. The service group key application list is a ciphertext obtained by encryption using an information encryption key derived from the key corresponding to the TEKID.

The message integrity check MIC value is the message integrity check value which is calculated by using the integrity check key derived by the key corresponding to the TEKID.

3) The UT sends a multicast key confirmation message to the BS. Wherein, after the UT receives the multicast key notification message, the UT verifies the message integrity check MIC value of the message by using the integrity check key derived by the key corresponding to the unicast key index TEKID. If the MIC value is incorrect, the message is discarded. If the MIC value is correct, the UT decrypts the service group key application list and confirms whether the service groups in the list are the service groups applied by the UT. If the identifiers of the service groups GIDs in the service group key application list are identical to those of the service groups registered by the UT, the multicast keys of the service groups GEKs to be applied by the UT are obtained. Then the UT feeds back the multicast key confirmation message, which comprises a unicast index NONCE, a service group response list and the message integrity check MIC value.

The unicast key index NONCE is a random number which is identical to the unicast key index NONCE in the foregoing multicast key notification message.

The service group key response list comprises the identifiers of the service groups GIDs to be applied by the UT. The list is a ciphertext obtained by encryption using the information encryption key derived by the key corresponding to the unicast key index TEKID.

The message integrity check MIC value is the message integrity check value which is calculated by using the integrity check key derived by the key corresponding to the unicast index TEKID.

After the BS receives the multicast key confirmation message sent by the UT, the BS verifies the message integrity check MIC value of the message by using the integrity check key derived by the key corresponding to the unicast key index TEKID, and confirms whether the message integrity check MIC value is correct or not. If the message integrity check MIC value is incorrect, then the message is discarded. If the message integrity check MIC value is correct, the BS decrypts the service group key response list, and confirms whether the service groups are the service groups applied by the UT upon the identifiers of the service group GIDs in the list. If the identifiers in the service group key response list are identical to the identifiers of the service groups registered by the UT in the step 1), it can be confirmed that the multicast keys of the service groups GEKs for the UT have been established successfully.

Moreover, the multicast key negotiation method suitable for the group call system according to the embodiment of the present invention may further include the following steps.

In the process of updating a multicast key of the service group, a multicast data frame is encrypted by using an old multicast key of the service group and sent. The new multicast key of the service group is enabled for encrypting and sending of the multicast data frame after all the UTs associated with the BS have completed the multicast key negotiation of the service group.

Preferably, for the convenience of engineering implementation, the multicast key notification message may further include a message interactive mechanism identifier FLAG, a present message identifier PFLAG, a multicast key security association MEKID, a BS identifier BSID, a UT identifier UTID and a unicast key index TEKID.

Preferably, for the convenience of engineering implementation, the multicast key confirmation message may further include a message interactive mechanism identifier FLAG (corresponding to that of the multicast key notification message), a present message identifier PFLAG (corresponding to that of the multicast key notification message), a multicast key security association MEKID (corresponding to that of the multicast key notification message), a BS identifier BSID (corresponding to that of the multicast key notification message), a UT identifier UTID (corresponding to that of the multicast key notification message) and a unicast key index TEKID (corresponding to that of the multicast key notification message).

The embodiment of the present invention further provides a multicast key negotiation system suitable for group call system. The system comprises a UT and a BS. The BS sends a multicast key notification message to the UT. After the UT receives the multicast key notification message, the UT derives the multicast keys of the service groups by decrypting the service group key application list from the multicast key notification message, constructs a multicast key confirmation message and sends the multicast key confirmation message to the BS.

The invention claimed is:

1. A multicast key negotiation method suitable for a group call system, comprising:

a) negotiating a unicast key between a UT and a BS, deriving an information encryption key and an integrity check key from the unicast key, and registering by the UT to the BS identifiers of service groups to which the UT pertains;

b) notifying, by the BS, the UT of multicast keys of service groups to be applied by the UT, constructing a multicast key notification message which comprises a service group key application list and a message integrity check value, and sending the multicast key notification message to the UT, wherein the service group key application list, which is a ciphertext obtained by encryption using the information encryption key, comprises identifiers and the multicast keys of the service groups to be applied by the UT;

c) decrypting, by the UT, the service group key application list on receiving the multicast key notification message sent by the BS to obtain the multicast keys of the service groups to be applied by the UT, constructing a multicast key confirmation message which comprises a service group key response list and the message integrity check value, and sending the multicast key confirmation message to the BS, wherein the service group key response list, which is a ciphertext obtained by encryption using the information encryption key, comprises the identifiers of the service groups which have been applied; and d) confirming, by the BS, that the multicast keys of the service groups for the UT have been established successfully upon the multicast key confirmation message sent by the UT.

2. The multicast key negotiation method suitable for a group call system according to claim 1, wherein:
   a multicast key of the service group is generated by the BS if the multicast key of the service group to be applied by the UT is applied for a first time in a network; or
   a multicast key of the service group in a first time application is forwarded by the BS if the multicast key of the service group to be applied by the UT has been applied in a network.

3. The multicast key negotiation method suitable for a group call system according to claim 2, further comprising:
   encrypting, by the BS, a multicast data frame by using an old multicast key of the service group and sending the multicast data frame, in a process of updating a multicast key of the service group, and
   enabling, by the BS, a new multicast key of the service group for encrypting and sending of the multicast data frame, upon completion of the multicast key negotiation of the service group for all the UTs associated with the BS.

4. The multicast key negotiation method suitable for a group call system according to claim 1, further comprising:
   verifying, by the UT, the message integrity check value of the multicast key notification message by using the derived integrity check key, before a process of decrypting the service group key application list;
   discarding the multicast key notification message if the message integrity check value is incorrect; and
   performing the step of decrypting the service group key application list if the message integrity check value is correct,
   wherein the decrypting the service group key application list and acquiring the multicast keys of the service groups to be applied by the UT comprises:
      obtaining the identifiers of the service groups to be applied by the UT from the service group key application list; and
      obtaining the multicast keys of the service groups to be applied by the UT if the identifiers of the service groups to be applied by the UT are identical to the identifiers of the service groups to which the UT pertains, registered by the UT with the BS.

5. The multicast key negotiation method suitable for a group call system according to claim 4, wherein the confirming by the BS the multicast keys of service groups for the UT have been established successfully upon the multicast key confirmation message sent by the UT comprises:
   verifying, by the BS, the message integrity check value of the multicast key confirmation message by using the derived integrity check key on receiving the multicast key confirmation message sent by the UT;
   discarding the multicast key confirmation message if the message integrity check value is incorrect;
   decrypting, by the BS, the service group key response list to obtain the identifiers of the service groups from the service group key response list if the message integrity check value is correct; and
   confirming that the multicast keys of the service groups for the UT have been established successfully, if the identifiers of the service groups to be applied by the UT are identical to the identifiers of the service groups to which the UT pertains, registered by the UT with the BS.

6. The multicast key negotiation method suitable for a group call system according to claim 5, wherein the multicast key notification message further comprises a message interactive mechanism identifier, a present message identifier, a multicast key security association, a BS identifier, a UT identifier and a unicast key index.

7. The multicast key negotiation method suitable for a group call system according to claim 6, wherein the multicast key confirmation message further comprises a message interactive mechanism identifier, a present message identifier, a multicast key security association, a BS identifier, a UT identifier and a unicast key index.

8. A multicast key negotiation system suitable for a group call system, comprising a UT and a BS, wherein the UT and the BS negotiate a unicast key and derive an information encryption key from the unicast key; the BS sends a multicast key notification message to the UT; and the UT receives the multicast key notification message and then decrypts a service group key application list from the multicast key notification message to obtain the multicast keys of the service groups, constructs a multicast key confirmation message, and sends the multicast key confirmation message to the BS, wherein the service group key application list, which is a ciphertext obtained by encryption using the information encryption key, comprises identifiers and the multicast keys of the service groups to be applied by the UT.

9. The multicast key negotiation method suitable for a group call system according to claim 2, further comprising:
   verifying, by the UT, the message integrity check value of the multicast key notification message by using the derived integrity check key, before a process of decrypting the service group key application list;
   discarding the multicast key notification message if the message integrity check value is incorrect; and
   performing the step of decrypting the service group key application list if the message integrity check value is correct;
   wherein the decrypting the service group key application list and acquiring the multicast keys of the service groups to be applied by the UT comprises:
      obtaining the identifiers of the service groups to be applied by the UT from the service group key application list; and
      obtaining the multicast keys of the service groups to be applied by the UT if the identifiers of the service groups to be applied by the UT are identical to the identifiers of the service groups to which the UT pertains, registered by the UT with the BS.

10. The multicast key negotiation method suitable for a group call system according to claim 9, wherein the confirming by the BS the multicast keys of service groups for the UT have been established successfully upon the multicast key confirmation message sent by the UT comprises:
    verifying, by the BS, the message integrity check value of the multicast key confirmation message by using the derived integrity check key on receiving the multicast key confirmation message sent by the UT;
    discarding the multicast key confirmation message if the message integrity check value is incorrect;
    decrypting, by the BS, the service group key response list to obtain the identifiers of the service groups from the service group key response list if the message integrity check value is correct; and
    confirming that the multicast keys of the service groups for the UT have been established successfully, if the identifiers of the service groups to be applied by the UT are identical to the identifiers of the service groups to which the UT pertains, registered by the UT with the BS.

11. The multicast key negotiation method suitable for a group call system according to claim 10, wherein the multicast key notification message further comprises a message interactive mechanism identifier, a present message identifier, a multicast key security association, a BS identifier, a UT identifier and a unicast key index.

12. The multicast key negotiation method suitable for a group call system according to claim 11, wherein the multicast key confirmation message further comprises a message interactive mechanism identifier, a present message identifier, a multicast key security association, a BS identifier, a UT identifier and a unicast key index.

13. The multicast key negotiation method suitable for a group call system according to claim 3, further comprising:
  verifying, by the UT, the message integrity check value of the multicast key notification message by using the derived integrity check key, before the process of decrypting the service group key application list;
  discarding the multicast key notification message if the message integrity check value is incorrect; and
  performing the step of decrypting the service group key application list if the message integrity check value is correct,
  wherein the decrypting the service group key application list and acquiring the multicast keys of the service groups to be applied by the UT comprises:
    obtaining the identifiers of the service groups to be applied by the UT from the service group key application list; and
    obtaining the multicast keys of the service groups to be applied by the UT if the identifiers of the service groups to be applied by the UT are identical to the identifiers of the service groups to which the UT pertains, registered by the UT with the BS.

14. The multicast key negotiation method suitable for a group call system according to claim 13, wherein the confirming by the BS the multicast keys of service groups for the UT have been established successfully upon the multicast key confirmation message sent by the UT comprises:
  verifying, by the BS, the message integrity check value of the multicast key confirmation message by using the derived integrity check key on receiving the multicast key confirmation message sent by the UT;
  discarding the multicast key confirmation message if the message integrity check value is incorrect;
  decrypting, by the BS, the service group key response list to obtain the identifiers of the service groups from the service group key response list if the message integrity check value is correct; and
  confirming that the multicast keys of the service groups for the UT have been established successfully, if the identifiers of the service groups to be applied by the UT are identical to the identifiers of the service groups to which the UT pertains, registered by the UT with the BS.

15. The multicast key negotiation method suitable for a group call system according to claim 14, wherein the multicast key notification message further comprises a message interactive mechanism identifier, a present message identifier, a multicast key security association, a BS identifier, a UT identifier and a unicast key index.

16. The multicast key negotiation method suitable for a group call system according to claim 15, wherein the multicast key confirmation message further comprises a message interactive mechanism identifier, a present message identifier, a multicast key security association, a BS identifier, a UT identifier and a unicast key index.

* * * * *